(12) United States Patent
Sun et al.

(10) Patent No.: US 9,928,851 B2
(45) Date of Patent: Mar. 27, 2018

(54) VOICE VERIFYING SYSTEM AND VOICE VERIFYING METHOD WHICH CAN DETERMINE IF VOICE SIGNAL IS VALID OR NOT

(71) Applicant: MEDIATEK INC., Hsin-Chu (TW)

(72) Inventors: Liang-Che Sun, Taipei (TW); Yiou-Wen Cheng, Hsinchu (TW); Ting-Yuan Chiu, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 175 days.

(21) Appl. No.: 14/024,642

(22) Filed: Sep. 12, 2013

(65) Prior Publication Data

US 2015/0073799 A1    Mar. 12, 2015

(51) Int. Cl.
*G10L 15/00*     (2013.01)
*G10L 25/78*     (2013.01)
*G10L 17/00*     (2013.01)

(52) U.S. Cl.
CPC .............. *G10L 25/78* (2013.01); *G10L 17/00* (2013.01); *G10L 2025/786* (2013.01)

(58) Field of Classification Search
CPC .... G10L 25/78; G10L 2025/786; G10L 17/00
USPC ................... 704/231, 236, 246, 275
See application file for complete search history.

(56) References Cited

U.S. PATENT DOCUMENTS

| 5,848,388 | A * | 12/1998 | Power et al. ................. 704/239 |
| 7,680,656 | B2  | 3/2010  | Zhang |
| 8,983,845 | B1 * | 3/2015 | Kristjansson et al. ........ 704/275 |
| 9,020,823 | B2  | 4/2015  | Hoepken |
| 2006/0293887 | A1 * | 12/2006 | Zhang ................. G10L 21/0208  704/233 |
| 2012/0203557 | A1 * | 8/2012 | Odinak .............. G01C 21/3608  704/270.1 |
| 2013/0060167 | A1 * | 3/2013 | Dracup et al. ................. 600/595 |
| 2014/0244269 | A1 * | 8/2014 | Tokutake ..................... 704/275 |
| 2014/0257813 | A1 * | 9/2014 | Mortensen .................... 704/251 |

FOREIGN PATENT DOCUMENTS

| CN | 101606191 A  | 12/2009 |
| CN | 102054481 A  | 5/2011  |
| CN | 202512508 U  | 10/2012 |
| CN | 103095911 A  | 5/2013  |
| CN | 103282957 A  | 9/2013  |

OTHER PUBLICATIONS

Analog Devices, SigmaDSP ADAU1701, Rev. B, (c)2007-2011 http://www.analog.com/media/en/technical-documentation/data-sheets/ADAU1701.pdf.*

* cited by examiner

*Primary Examiner* — Thierry L Pham
(74) *Attorney, Agent, or Firm* — Winston Hsu

(57) ABSTRACT

A voice verifying system, which comprises: a microphone, which is always turned on to output at least one input audio signal; a speech determining device, for determining if the input audio signal is valid or not according to a reference value, wherein the speech determining device passes the input audio signal if the input audio signal is valid; and a verifying module, for verifying a speech signal generated from the input audio signal and for outputting a device activating signal to activate a target device if the speech signal matches a predetermined rule; and a reference value generating device, for generating the reference value according to speech signal information from the verifying module.

17 Claims, 5 Drawing Sheets

VOICE VERIFYING SYSTEM AND VOICE VERIFYING METHOD WHICH CAN DETERMINE IF VOICE SIGNAL IS VALID OR NOT

BACKGROUND

A voice verifying system is always applied to a portable electronic apparatus such as a GPS or a mobile phone, such that a user can use a voice command (i.e. a speech signal) to activate the portable electronic device or to control the portable electronic device to perform some function. However, in order to receive the voice, a microphone of the portable electronic device needs to be always turned on to receive the voice. Also, a verifying module of the portable electronic device is always turned on in order to verify the received voice. Therefore, the power consumption for the voice verifying system of related art is high.

SUMMARY

One objective of the present application is to provide a voice verifying system that can adjust the standard for determining if the input audio signal is valid and turns on at least one device according to the input audio signal.

Another objective of the present application is to provide a voice verifying method that can adjust the standard for determining if the input audio signal is valid and turns on at least one device according to the input audio signal.

One embodiment of the present invention discloses a voice verifying system, which comprises: a microphone, which is always turned on to output at least one input audio signal; a speech determining device, for determining if the input audio signal is valid or not according to a reference value, wherein the speech determining device passes the input audio signal if the input audio signal is valid; and a verifying module, for verifying a speech signal generated from the input audio signal and for outputting a device activating signal to activate a target device if the speech signal matches a predetermined rule; and a reference value generating device, for generating the reference value according to speech signal information from the verifying module.

Another embodiment of the present invention discloses a voice verifying method, comprising: always turning on a microphone to output at least one input audio signal; determining if the input audio signal is valid or not according to a reference value, and passing the input audio signal to be a speech signal if the input audio signal is valid; and verifying the speech signal generated from the input audio signal by a predetermined rule, and outputting a device activating signal to activate a target device if the speech signal matches the predetermined rule; generating the reference value according to speech signal information generated from a verifying result.

In view of above-mentioned embodiments, the standard for determining if the input audio signal is valid can be adjusted according to at least one factor, and at least one device in the system is turned off (or in the sleep mode) until receives the input audio signal. By this way, the power efficiency can be optimized.

DETAILED DESCRIPTION

Figure 1:
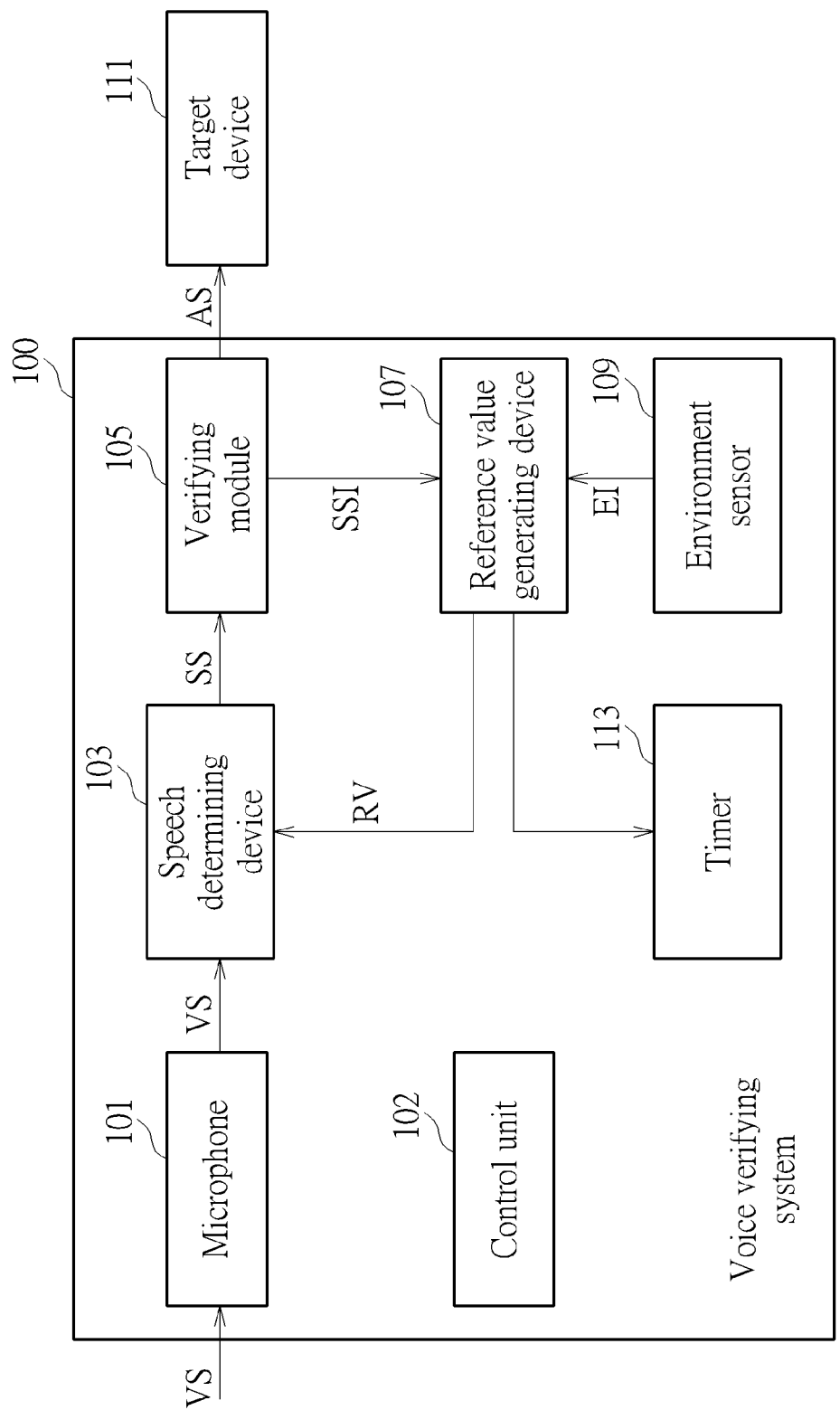
FIG. 1 is a block diagram for a voice verifying system according to an embodiment of the present application.

FIG. 1 is a block diagram for a voice verifying system according to an embodiment of the present application. As shown in FIG. 1, the voice verifying system 100 comprises a microphone 101, a speech determining device 103, a verifying module 105, a reference value generating device 107 and an environment sensor 109. The operations for the devices in the voice verifying system 100 can be controlled by a control unit 102, which can be excluded from the voice verifying system 102. For example, a processor for a mobile phone that the voice verifying system 100 is provided in can be utilized to control the voice verifying system 100 as well.

The microphone 101 is always turned on and transmits a input audio signal VS to the speech determining device 103. The speech determining device 103 determines if the input audio signal VS is valid or not according to a reference value RV, and outputs the input audio signal VS if the input audio signal VS is valid. For more detail, the microphone 101 may transmits undesired input audio signals besides the speech signal SS to the speech determining device 103, and the speech determining device 103 blocks/filters the undesired input audio signals and passes the speech signal SS. In one embodiment, at least one of the verifying module 105, the reference value generating device 107 and the environment sensor 109 is initially turned off (or in the sleep mode) and is turned on if the speech determining device 103 outputs the speech signal SS to the verifying module 105. The at least one of the verifying module 105, the reference value generating device 107 and the environment sensor 109 keeps non-active if the speech determining device 103 does not output the speech signal SS to the verifying module 105.

The verifying module 105 receives the speech signal SS and determines if the speech signal SS matches a predetermined rule. Also, the verifying module 105 outputs a device activating signal AS if the speech signal SS matches the predetermined rule and does not output the device activating signal AS if the speech signal SS does not match the predetermined rule. In one embodiment, the predetermined rule is: if the speech signal SS matches a specific command. The specific command can be, for example, "play music", "play video", or "call xxx" (xxx can be anyone's name), and the verifying module 105 can be provided in a mobile phone. Alternatively, the predetermined rule can be: if the speech signal SS belongs to a specific person. The voice data for the specific person can be pre-recorded in the verifying module 105 such that the verifying module 105 can identify if the speech signal SS belongs to the specific person. However, please note the predetermined rule is not limited to above-mentioned examples.

As above-mentioned, the verifying module 105 outputs the device activating signal AS if the speech signal SS matches the predetermined rule. The device activating signal AS is utilized to activate a target device 111. The target device 111 can be other devices for the apparatus that the voice verifying system 100 is provided in. For example, the voice verifying system 100 is provided in a mobile phone and the target device 111 is a display which is in a sleep mode until receives the device activating signal AS. Alternatively, in another example the voice verifying system 100 is provided in a GPS apparatus and the target device 111 is a navigating module which is not turned on and does not perform any navigating function until receives the device activating signal AS. Additionally, the target device 111 can be a main processor for the apparatus that the voice verifying system 100 is provided in. Therefore, if the main CPU is initially turned off (or in the sleep mode) and is only activated by the device activating signal AS, the power consumption can be greatly reduced.

The environment sensor 109 senses environment surrounding the environment sensor 109 to generate at least one environment parameter EI to the reference value generating device 107. The reference value generating device 107 generates the reference value RV according to the environment parameter EI. The environment parameter EI comprises at least one of following parameters: a noise level parameter, a motion parameter, a temperature parameter and a location parameter. The noise level parameter indicates the noise situation surrounding the voice verifying system 100. The motion parameter indicates if the voice verifying system 100 moves, and how fast does it move. The temperature parameter indicates the temperature for the environment surrounding the voice verifying system 100. The location parameter indicates the location of the voice verifying system 100.

The noise level may affect the identifying accuracy for the speech signal. Also, the motion parameter or the location parameter can indicate if the user is in the car or in a meeting room, or the user is running, walking, sitting. The temperature may affect the input audio signal. Therefore, all these parameters need different standards such that the input audio signal can be accordingly determined to be valid or not, therefore the reference value RV should be accordingly adjusted.

The environment sensor 109 can be different kinds of sensors to sense the above-mentioned parameters. For example, the environment sensor 109 can comprise a noise sensor to sense the noise level. Also, the environment sensor 109 can comprise a motion sensor such as a G sensor to sense the motion parameter. Alternatively, the environment sensor 109 can comprise an image capture device such as a glass can capture image for identifying the location, thereby generates the location parameter. Additionally, the environment sensor 109 can comprise a temperature sensor to sense the temperature. The above-mentioned sensors can be independent sensors or combined together to form a virtual sensor.

Besides the above mentioned parameters, the reference value generating device 107 may further refer to the microphone sensitivity parameter to generate the reference value RV. The microphone sensitivity parameter indicates the sensitivity of the microphone 101, which affects the input audio signal VS. For example, if the microphone sensitivity is high, the microphone outputs a input audio signal containing voice for a large region, thus the noise component and the speech component are both high. On the contrary, if the microphone sensitivity is low, the microphone outputs a input audio signal containing voice for a small region, thus the noise component and the speech component are both low. Therefore, different standards for determining the input audio signal s are valid or not are needed. Therefore, the reference value RV should be updated according to the microphone sensitivity parameter.

In one embodiment, the verifying module 105 computes the speech signal SS to acquire speech signal information SSI of the speech signal SS and transmits the speech signal information SSI to the reference value generating device 103. The reference value generating device 103 generates the reference value RV according to the environment parameter EI and the speech signal information SSI. The information of the speech signal comprises at least one of following information: a noise type of the speech signal, a signal to noise ratio (SNR) of the speech signal, a time duration that the speech determining device does not determine that the speech signal exists (i.e. a silent time duration). Either the noise type or the SNR of the speech signal affects the determining of the speech signal. Also, the silent time duration indicates the possibility that the reference value RV is improper for current situation. For example, if the silent time duration is too long, it may indicates the reference value RV is too strict such that the speech signal can not be identified. On the contrary, if the silent time duration is too short, it may indicates the reference value RV is too loose such that the input audio signal which is not the speech signal is also wrongly determined to be the speech signal.

In another embodiment, the voice verifying system 100 further comprises a timer 113 to control the time duration that the reference value generating device 107 generates a new reference value RV.

Briefly speaking, the voice verifying system 100 updates the standard (i.e. the reference value RV) for determining if the input audio signal VS is valid or not(ex. the input audio signal VS is the speech signal SS or not) according to at least one of the environment parameter EI, the speech signal information SSI, and the microphone sensitivity parameter. After that, at least one of the verifying module 105, a reference value generating device 107 and an environment sensor 109 which is initially turned off (or in the sleep mode) will be turned on if the speech determining device 103 determines the input audio signal VS is valid and outputs the speech signal SS to the verifying module 105. Also, the target device 111 is not activated until receives the device activating signal AS. Therefore, the power consumption for the apparatus utilizing the voice verifying system according to the present application can be reduced.

Figure 2:
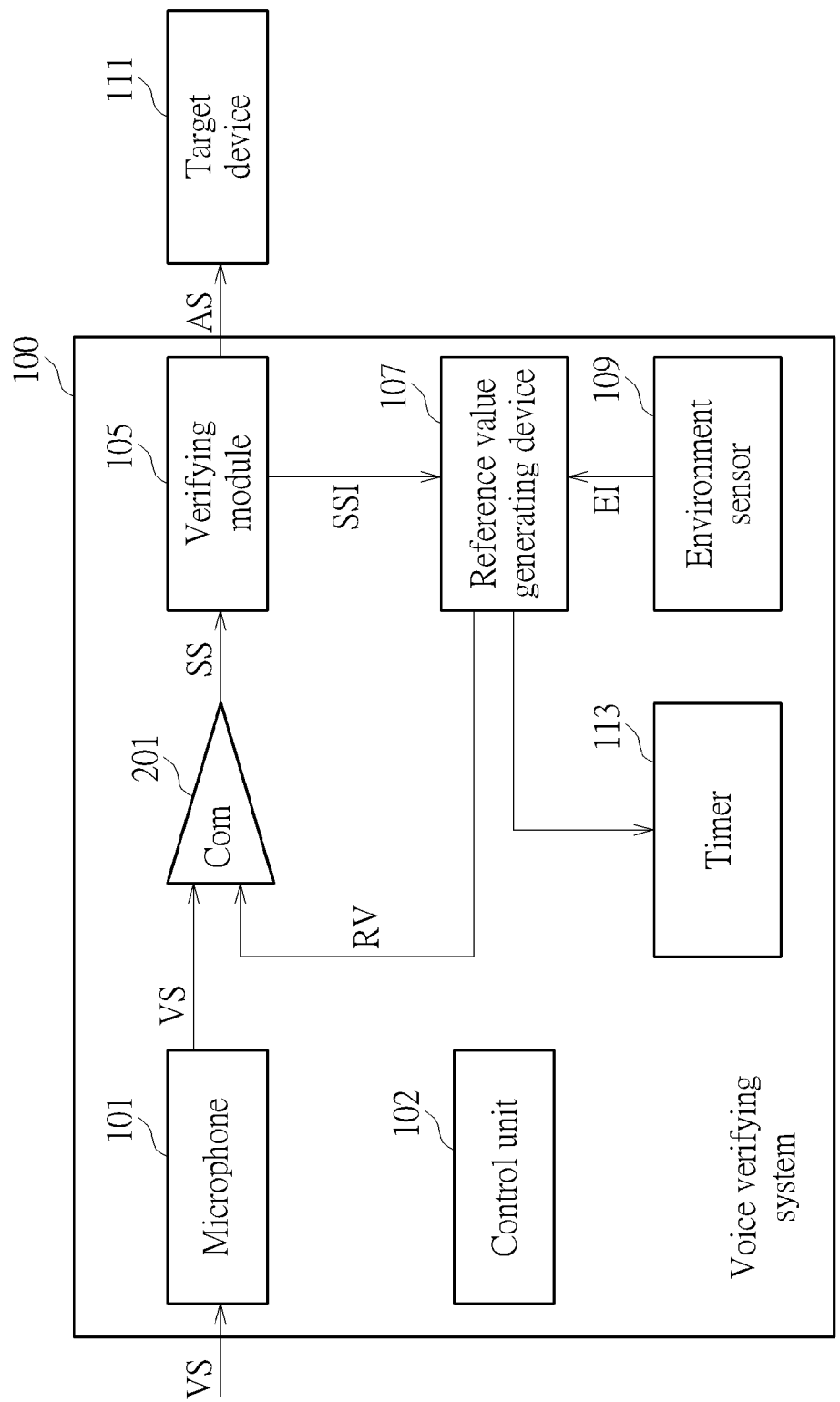
FIG. 2 is a block diagram for a voice verifying system according to another embodiment of the present application.

Many devices can be applied as the speech determining device 303. In the embodiment of FIG.2, a comparator 201 can be applied as the speech determining device 103 in FIG.1. The comparator 201 comprises two input terminals respectively receiving the input audio signal VS and the reference value RV. The comparator 201 compares energy level or energy difference of the input audio signal VS with the reference value RV. The speech determining device 103 determines the input audio signal VS is valid (ex. the input audio signal VS is the speech signal SS) if the energy level or energy difference of the input audio signal VS exceeds the reference value RV. On the contrary, the speech determining device 103 determines the input audio signal VS is invalid (ex. the input audio signal VS is not a speech signal SS)if the energy level or energy difference of the input audio signal VS is less than the reference value RV As above-mentioned description, the reference value RV can be generated according to various kinds of parameters, thus the reference value RV can be adjusted corresponding to various situations such that the standard for determining the speech signal can be adjusted to be loose or strict. For example, if the environment parameter EI indicates at least one of following situation the voice verifying system does not move, the voice verifying system is hold in a hand of an user (ex. a mobile phone comprising the voice verifying system is hold in a hand of an user), and the voice verifying system is in a moving car, then the reference value generating device 107 decreases the reference value RV. If the voice verifying system is in any one of the above-mentioned situations, the user may want to use the voice control function, thus the reference value RV is decreased such that the comparator can easily pass the speech signal to activate other devices. On the contrary, in other situations the user rarely uses the voice control function such that the reference value RV is adjusted to be high thereby the comparator can block most input audio signal. By this way other devices can keep non-activated to save power. In another example, the reference value RV is increased if the voice verifying system is put in a pack. The user rarely utilizes the voice control function if the voice verifying system is put in a pack (ex. a mobile phone comprising the voice verifying system is put in a pack), thus the reference value RV is increased such that other devices can keep non-activated to save power. Please note the above-mentioned situations are only for example and do not mean to limit the scope of the present invention.

In one embodiment, the microphone is a digital microphone, thus the input audio signal VS output from the microphone 101 and the speech signal SS are all digital. However, the input audio signal VS outputted from the microphone 101 and the speech signal SS can also be an analog signal. In another embodiment, the micro phone is an analog microphone and an analog to digital converter can be further comprised in the voice verifying system.

Figure 3:
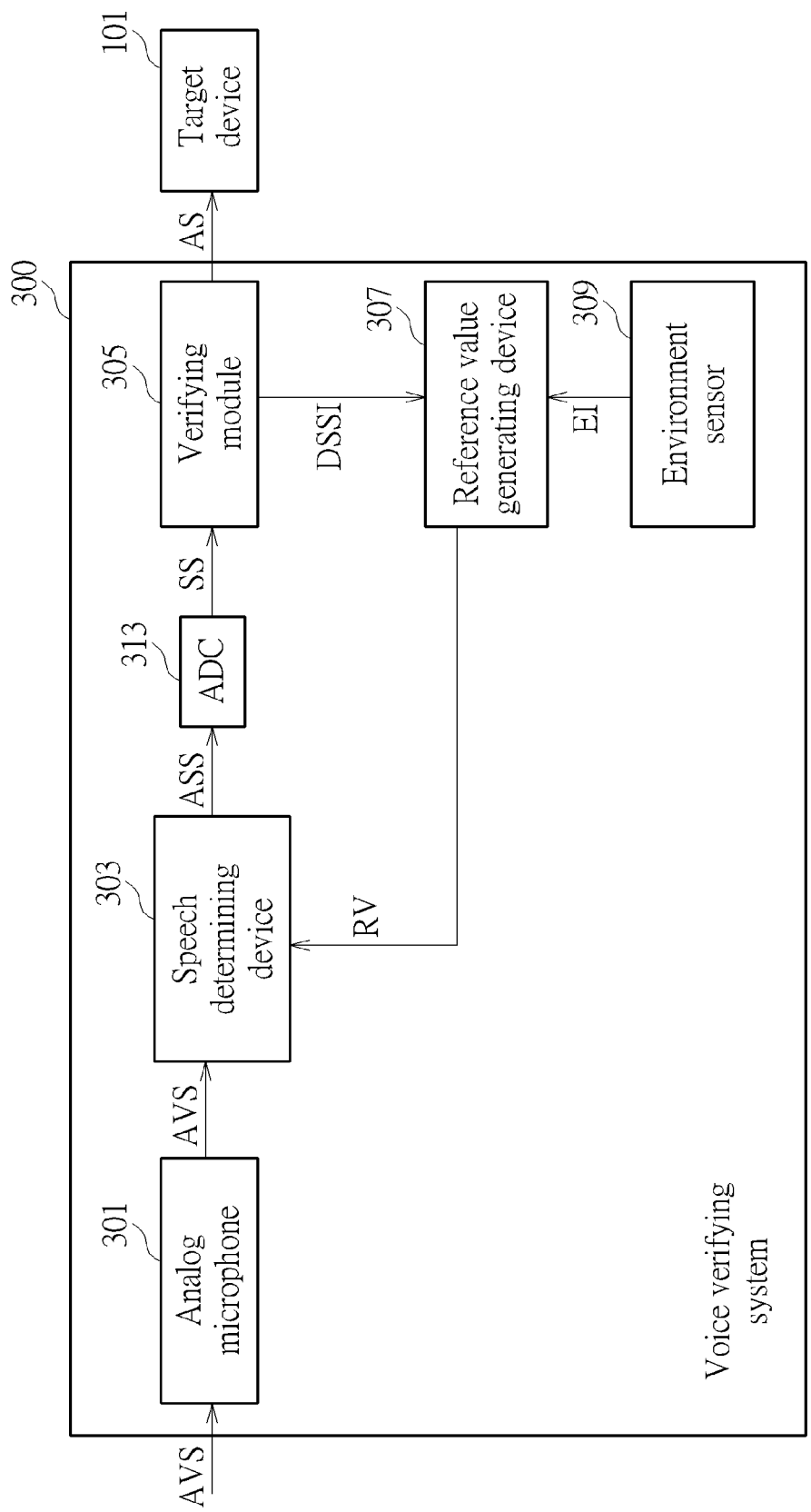
FIG. 3 is a block diagram for a voice verifying system according to still another embodiment of the present application.

FIG. 3 is a block diagram for a voice verifying system 300 according to another embodiment of the present application. The same as the embodiment in FIG. 1, the voice verifying system 300 also comprises the speech determining device 303, a verifying module 305, a reference value generating device 307, and an environment sensor 309. However, the voice verifying system 300 comprises an analog microphone 301 rather than the microphone 101 in the embodiment of FIG. 1. Therefore, the voice verifying system 300 further comprises an ADC 313 provided between the analog microphone 301 and the verifying module 305. Please note in FIG. 3 the ADC 313 is located behind the speech determining device 303. However, in another embodiment the ADC can be located in front of the speech determining device.

Therefore, the operation for the voice verifying system 300 has some difference from which of the voice verifying system 100 when the microphone 101 is a digital microphone. For the voice verifying system 100, the microphone 101 outputs a digital input audio signal VS to the speech determining device 103. The speech determining device 103 determines if the digital input audio signal VS is a digital speech signal SS and passes the digital speech signal SS to the verifying module 105 according to the reference value RV.

For the voice verifying system 300, the analog microphone 301 outputs an analog input audio signal AVS to the speech determining device 303. The speech determining device 303 determines if the analog input audio signal AVS is valid or not according to the reference value RV (ex. if the analog input audio signal AVS is an analog speech signal ASS) and passes the analog speech signal ASS to the ADC 313 if the analog input audio signal AVS is valid. The ADC 313 converts the analog speech signal ASS to a speech signal SS and transmits the speech signal SS to the verifying module 305.

Additionally, for the voice verifying system 100, at least one of the verifying module 105, a reference value generating device 107 and an environment sensor 109 is initially turned off (or in the sleep mode) and is turned on if the speech determining device 103 outputs the digital speech signal SS to the verifying module 105. For the voice verifying system 300, at least one of the verifying module 305, the reference value generating device 307 and the environment sensor 309 and the ADC 313 is initially turned off (or in the sleep mode) and is turned on if the speech determining device 303 outputs the analog speech signal ASS. By this way, the power consumption can be further reduced since the ADC can be initially turned off or in the sleep mode.

The operations for the verifying module 305, the reference value generating device 307, and the environment sensor 309 in FIG. 3 are similar with which of the verifying module 105, the reference value generating device 107, and the environment sensor 109 in FIG. 1, thus are omitted for brevity here. Also, the voice verifying system 300 can also comprise the control unit 102 and the timer 113 in FIG. 2. Furthermore, the comparator in FIG. 2 can also be applied as the speech determining device 303 in FIG. 3.

As above-mentioned, in another embodiment that the ADC 313 can be located in front of the speech determining device 303. In such embodiment, the analog input audio signal received by the analog microphone is transferred to a digital input audio signal first via the ADC, thus the speech determining device 303 receives the digital input audio signal rather then the analog input audio signal AVS described above. Additionally, in such embodiment the ADC can be a low power ADC to save power consumption. In such embodiment, operations of the speech determining device, the verifying module, the reference value generating device and the environment sensor are the same as which of FIG.1 with a digital input audio signal VS, thus are omitted for brevity here.

Figure 4:
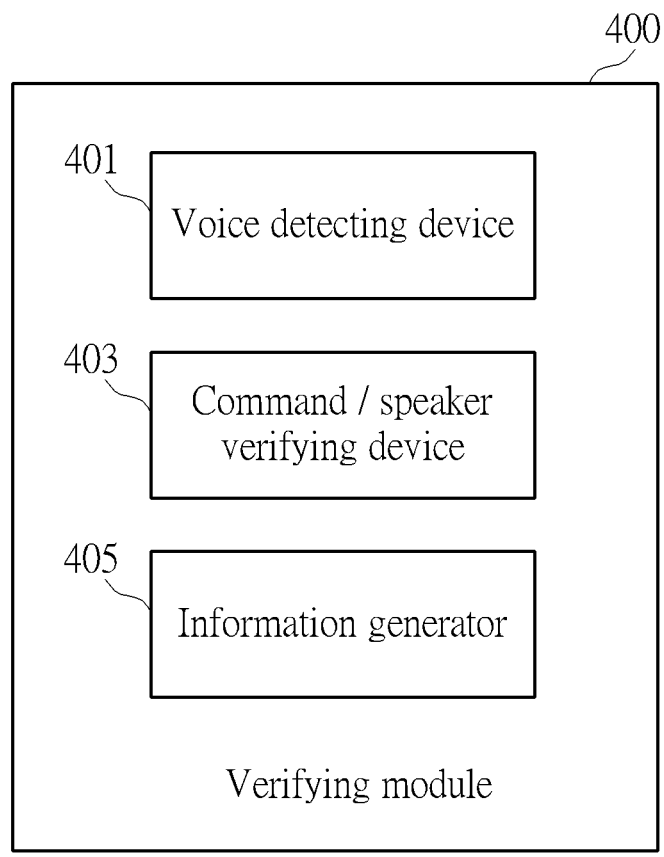
FIG. 4 is a block diagram illustrating an example for detail structures for the verifying module illustrated in FIG. 1-FIG. 3.

FIG.4 is a block diagram illustrating an example for detail structures for the verifying module illustrated in FIG.1-FIG.3. As shown in FIG.4, the verifying module 400 (i.e. the verifying module 105, 305 in FIG.1 and FIG.3) comprises a voice detecting device 401, a command/speaker verifying device 403, and an information generator 405. The voice detecting device 401 detects input audio signal (i.e. the above mentioned analog speech signal or digital speech signal). The command/speaker verifying device 403 verifies if the command or the person generates the speech signal is valid or not (i.e. determines if the speech signal matches a predetermined rule or not) and the verifying module 400 outputs the above-mentioned device activating signal AS if the speech signal is valid. The information generator generates the information for the speech signal EI. However, please note the structure for the verifying module is not limited to the example in FIG.4.

Figure 5:
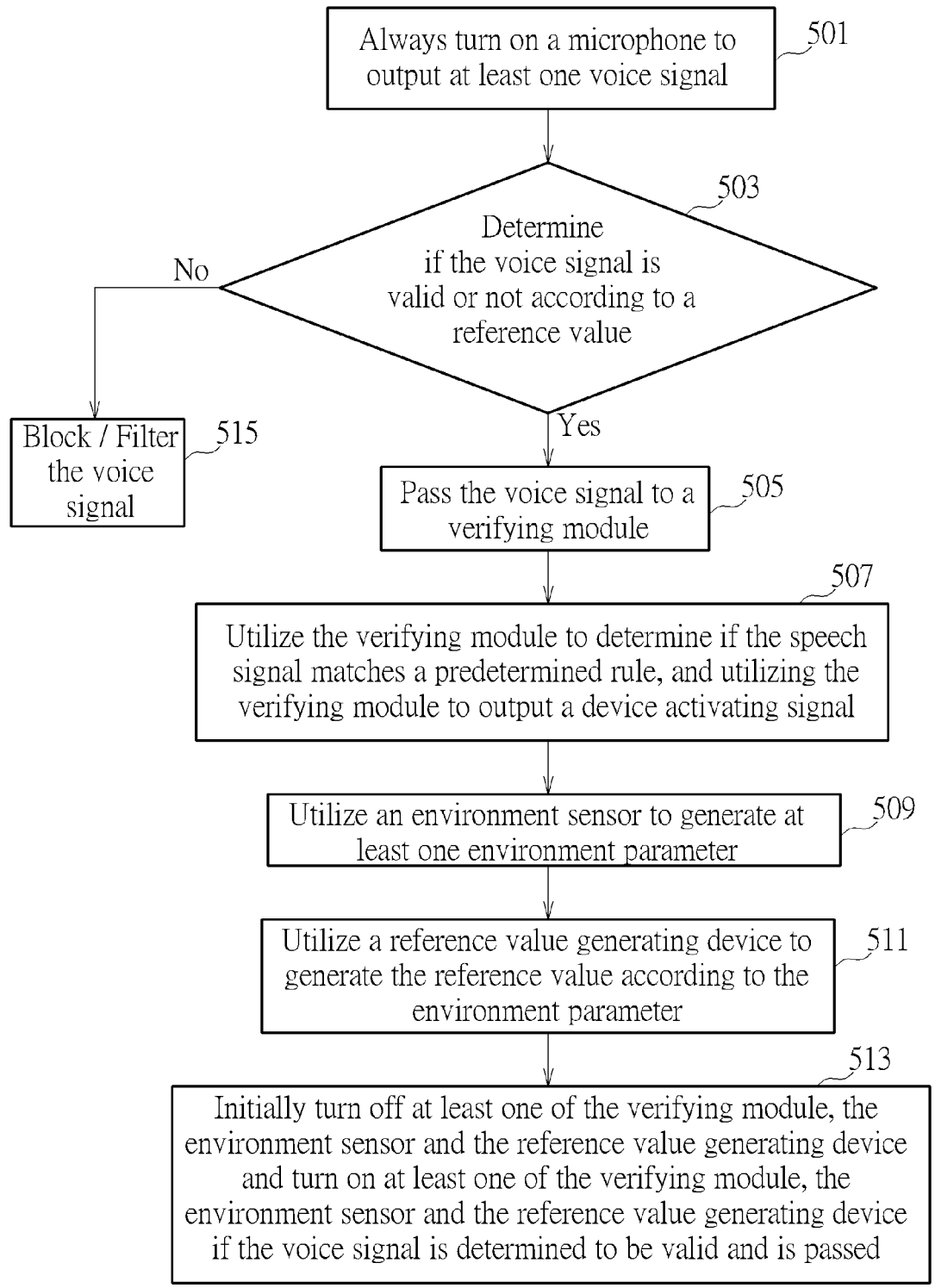
FIG. 5 is a flow chart illustrating a voice verifying method according one embodiment of the present application.

In view of above-mentioned embodiments, a voice verifying method applied to a voice verifying system as shown in FIG. 5 can be acquired, which comprises the following steps:

Step 501

Always turn on a microphone to output at least one input audio signal.

Step 503

Determine if the input audio signal is valid or not according to a reference value. If yes, go to step 505. If not, go to step 515 to block the input audio signal.

Step 505

Pass the input audio signal to a verifying module.

Step 507

Utilize the verifying module to determine if the speech signal matches a predetermined rule, and utilizing the verifying module to output a device activating signal for activating a target device if the speech signal matches the predetermined rule.

Step 509

Utilize an environment sensor to sense environment surrounding the environment sensor to generate at least one environment parameter.

Step 511

Utilize a reference value generating device to generate the reference value according to the environment parameter.

Step 513

Initially turn off at least one of the verifying module, the environment sensor and the reference value generating device and turn on at least one of the verifying module, the environment sensor and the reference value generating device if the input audio signal is determined to be valid and is passed in the previous steps.(or control them to be in the sleep mode). The at least one of the verifying module, the environment sensor and the reference value generating device keeps non active if the verifying module does not receive the speech signal.

Step 515

Block/filter the input audio signal.

In view of above-mentioned embodiments, the standard for determining if the speech signal exists can be adjusted according to at least one factor, and at least one device in the system is turned off until receives the speech signal . By this way, the power efficiency can be optimized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voice verifying system, comprising:
a microphone, which is always turned on to receive at least one input audio signal;
a speech determining device, for determining if the input audio signal is valid or not according to a reference value, wherein the speech determining device passes the input audio signal if the input audio signal is valid;
a verifying module, for verifying a speech signal generated from the input audio signal and for outputting a device activating signal to activate a target device if the speech signal matches a predetermined rule; and
a reference value generating device, for adjusting the reference value according to speech signal information from the verifying module while the input audio signal comprises the speech signal;
wherein the speech determining device comprises a comparator for comparing an energy level, or an energy difference, or a signal to noise ratio (SNR) of the input audio signal with the reference value;
wherein the speech determining device determines the input audio signal is valid if the energy level, or the energy difference, or the signal to noise ratio (SNR) of the input audio signal exceeds the reference value.

2. The voice verifying system of claim 1, wherein the verifying module computes the speech signal to generate the speech signal information to the reference value generating device, wherein the reference value generating device adjusts the reference value according to the speech signal information.

3. The voice verifying system of claim 1, further comprising:
an environment sensor, for sensing environment surrounding the environment sensor to generate at least one environment parameter.

4. The voice verifying system of claim 1, wherein the reference value generating device adjusts the reference value according to a microphone sensitivity parameter and the speech signal.

5. The voice verifying system of claim 3, if the environment parameter indicates the voice verifying system is put in a pack, the reference value generating device increases the reference value.

6. The voice verifying system of claim 1, wherein the microphone is a digital microphone, the input audio signal output from the microphone and the speech signal are digital signals.

7. The voice verifying system of claim 1, wherein the microphone is an analog microphone, the input audio signal output from the microphone is an analog signal and the speech signal is a digital signal, wherein the voice verifying system comprises:
an analog to digital converter, located behind the speech determining device, for converting the input audio signal passing the speech determining device to the speech signal;
wherein at least one of the verifying module, the reference value generating device and the analog to digital converter is initially turned off and is turned on if the speech determining device passes the input audio signal.

8. The voice verifying system of claim 1, wherein the microphone is an analog microphone for outputting an analog input audio signal, where the input audio signal and the speech signal are digital signals, wherein the voice verifying system comprises:
an analog to digital converter, located in front of the speech determining device, for converting the analog input audio signal to the input audio signal.

9. The voice verifying system of claim 8, wherein the analog to digital converter is a low power analog to digital converter.

10. A voice verifying method, comprising:
always turning on a microphone to receive at least one input audio signal;
determining if the input audio signal is valid or not according to a reference value, and passing the input audio signal to be a speech signal if the input audio signal is valid;
verifying the speech signal generated from the input audio signal by a predetermined rule, and outputting a device activating signal to activate a target device if the speech signal matches the predetermined rule; and
adjusting the reference value according to speech signal information generated from a verifying result while the input audio signal comprises the speech signal;
wherein the step of determining if the voice signal is valid or not according to a reference value comprises:
comparing an energy level, or an energy difference, or a signal to noise ratio (SNR), of the input audio signal with the reference value; and
determining the input audio signal is valid if the energy level, or the energy difference, or the signal to noise ratio (SNR) of the input audio signal exceeds the reference value.

11. The voice verifying method of claim 10, further comprising:
computing the speech signal to generate the speech signal information to the reference value generating device; and
adjusting the reference value according to the speech signal information.

12. The voice verifying method of claim 10, further comprising:
sensing environment to generate at least one environment parameter.

13. The voice verifying method of claim 10, further comprising:
adjusting the reference value according to a microphone sensitivity parameter and the speech signal.

14. The voice verifying method of claim 12, if the environment parameter indicates the environment is in a pack, increasing the reference value.

15. The voice verifying method of claim 10, wherein the microphone is a digital microphone, the input audio signal output from the microphone and the speech signal are digital signals.

16. The voice verifying method of claim 10, wherein the microphone is an analog microphone, the input audio signal output from the microphone is an analog signal and the speech signal is a digital signal, wherein the voice verifying method further comprises:
performing an analog to digital converting operation to convert the input audio signal to the speech signal; and
initially turning off at least one of a verifying module for outputting the device activating signal, a reference value generating device for adjusting the reference value and an analog to digital converter for performing the analog to digital converting operation, and turning on at least one of the verifying module, the reference value generating device and the analog to digital converter if the input audio signal is passed to be the speech signal.

17. The voice verifying method of claim 10, wherein the microphone is an analog microphone for outputting an analog input audio signal, where the input audio signal and the speech signal are digital signals, wherein voice verifying method further comprises:
performing an analog to digital converting operation to convert the analog input audio signal to the input audio signal.

* * * * *